(12) United States Patent
Radmacher

(10) Patent No.: US 8,901,467 B2
(45) Date of Patent: Dec. 2, 2014

(54) MULTI-LAYER CERAMIC HEATER AND/OR IGNITER AND METHOD FOR MAKING THE SAME

(75) Inventor: Stephen Radmacher, Pickering (CA)

(73) Assignee: Surface Igniter LLC, Chagrin Falls, OH (US)

( * ) Notice: Subject to any disclaimer, the term of this patent is extended or adjusted under 35 U.S.C. 154(b) by 173 days.

(21) Appl. No.: 12/963,796

(22) Filed: Dec. 9, 2010

(65) Prior Publication Data

US 2012/0145695 A1 Jun. 14, 2012

(51) Int. Cl.
| | |
|---|---|
| *H05B 6/70* | (2006.01) |
| *F23H 7/00* | (2006.01) |
| *F23Q 7/06* | (2006.01) |
| *B28B 1/00* | (2006.01) |
| *C04B 35/593* | (2006.01) |
| *B28B 1/26* | (2006.01) |
| *F23Q 7/00* | (2006.01) |
| *C04B 37/00* | (2006.01) |
| *F23Q 7/22* | (2006.01) |

(52) U.S. Cl.
CPC ............ *F23Q 7/06* (2013.01); *C04B 2237/588* (2013.01); *C04B 2237/368* (2013.01); *C04B 2237/76* (2013.01); *C04B 2235/3891* (2013.01); *B28B 1/008* (2013.01); *C04B 35/593* (2013.01); *B28B 1/26* (2013.01); *F23Q 7/001* (2013.01); *C04B 37/001* (2013.01); *C04B 2235/6027* (2013.01); *F23Q 7/22* (2013.01); *C04B 2237/582* (2013.01)

USPC .......................................... 219/670; 123/145

(58) Field of Classification Search
USPC ........ 219/270, 267, 260, 264; 123/266, 145 A
See application file for complete search history.

(56) References Cited

U.S. PATENT DOCUMENTS

| | | | | |
|---|---|---|---|---|
| 4,486,651 | A | * 12/1984 | Atsumi et al. | ................. 219/553 |
| 5,362,944 | A | * 11/1994 | Hatanaka et al. | ............. 219/270 |
| 6,660,970 | B1 | * 12/2003 | Geissinger et al. | ............ 219/270 |
| 2002/0185485 | A1 | * 12/2002 | Radmacher | ................... 219/270 |

* cited by examiner

*Primary Examiner* — Henry Yuen
*Assistant Examiner* — Thomas Ward
(74) *Attorney, Agent, or Firm* — Lowe Hauptman & Ham LLP

(57) ABSTRACT

A multi-layer rod shaped ceramic igniter includes an elongated tapered electrode having a central core of resistant material and two annular segments. One of the segments in on one side of the core and the other on an opposite side and connected to two slightly converging facets extending along the core. The multi-layered rod shaped ceramic igniters disclosed herein may be manufactured by slip-casting, injection molding or extruding a green annular body and removing material from opposite sides of the green body to form two almost parallel but slightly converging facets that extend over the heater igniter between the back surface and the tip of the igniter. After removing material between the annular segments the igniter is air dried and then heated in a vacuum at atmospheric pressure to approximately 900° C. in order to burn off the organic binder. The ceramic is then held in an inert atmosphere and heated to a temperature of 1600° C. and under an isotatic pressure of greater than 10 mega pascales for sintering the layer into a unitary monolithic structure.

2 Claims, 4 Drawing Sheets

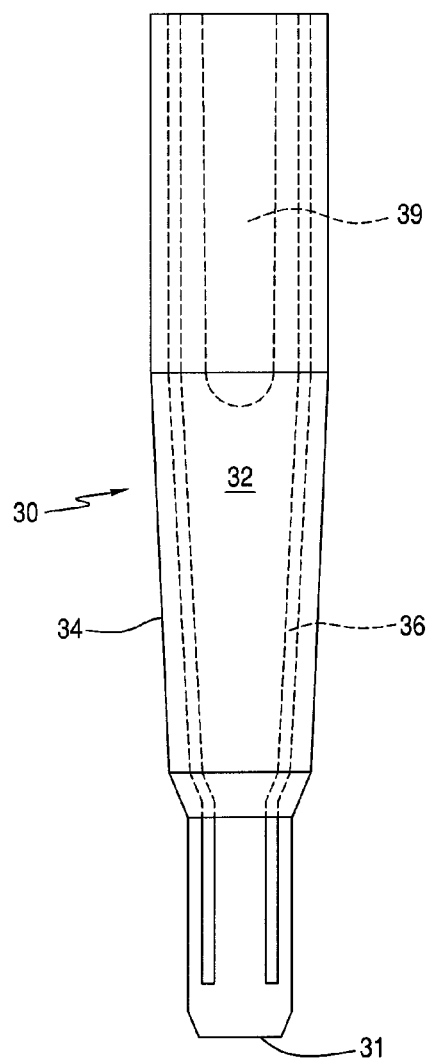
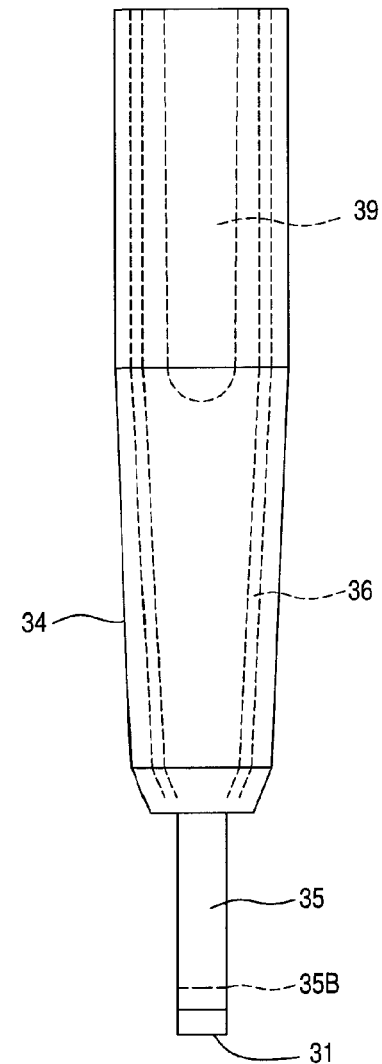
FIG. 5  FIG. 6
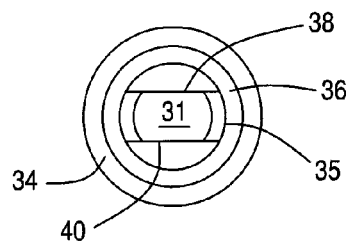
FIG. 7

MULTI-LAYER CERAMIC HEATER AND/OR IGNITER AND METHOD FOR MAKING THE SAME

FIELD OF THE INVENTION

This invention relates to a multi-layer ceramic heater and/or igniter and more particularly to electric heaters for igniting a gas in an appliance or for use in a compression type engine and to a method for manufacturing heaters/igniters with improved properties and more rapid response time.

BACKGROUND OF THE INVENTION

Ceramic heaters and igniters are well known and have been in use for many years. For example, ceramic igniters are being used extensively for igniting gas in appliances such as clothes dryers, stoves, ovens, water heaters, furnaces, pool heaters, etc. Heaters and/or igniters are also widely used for operating compression type engines or diesel engines. These heaters commonly referred to as glow plugs are installed in the engines wherein a portion of the heater extends into the combustion chamber to transfer heat to the fuel-air mixtures contained in the cylinder.

Ceramic igniters require a variety of performance requirements. For example, high speed or fast time to-temperature that is the time required to heat an element from room temperature to a temperature required for the ignition of a gas/air mixture. Another requirement for igniters is durability i.e. to operate for extended periods of time without being replaced.

A composite monolithic element for use as a hot surface igniter is disclosed in a U.S. Pat. No. 6,328,913 of Shaffer et al. As disclosed therein a hot surface igniter includes first and second regions or layers. The first region or layer comprises a low pressure ejection molded mixture of silicon carbide and silicon nitride particles or other compatible mixes which will alter processing as a resistor. The resistor includes two cold portions and a hot portion intermediate thereof. The second region or layer also includes an ejection molded mixture of silicon carbide and silicon nitride particles or other appropriate mixture, while the second layer contains the same or similar compounds as the first, the ratios of the compounds differ so that after processing it acts as an insulator and as a support for the first layer. These first and second layers are bonded together to form a joint free mechanically continuous structure and densified.

A more recent patent of mine, U.S. Pat. No. 6,610,964 relates to a multi-layer ceramic heater for igniting fuel in a diesel engine having an electrode, an insulative layer disposed over the electrode, a resistive layer disposed over the insulative layer at the tip of the heater and a conductive layer covering the insulative layer and extending from the resistive layer over the insulative layer to the base of the heater. A substantial proportion of the volume of resistive layer is located in close proximity to the tip of the heater. The resistive layer has a positive temperature coefficient (PTC) of electrical resistance and preferably a portion of the electrode is variably resistive for self-regulation purposes. Due to the geometry of the resistive layer and the variable resistive characteristics of the resistive layer and the electrode, the heater is well suited for applications that require quick start heating as well as good after glow properties or prolong heating at high temperatures.

Notwithstanding the above, it presently believed that there is a need and a potential commercial market for a multi-layer ceramic heater/igniter. There should be a need and a commercial market for such igniters because they have unique electrical properties and quick start-up from room temperature to ignition temperature. Further, such igniters are durable and capable of operating for extended periods of time without being replaced. Such igniters are also capable of being manufactured at competitive costs.

BRIEF SUMMARY OF THE INVENTION

In essence, the present invention contemplates a generally rod shaped heater/igniter comprising and/or consisting of an elongated tapered electrode having a central core of resistive material and defining two annular segments or two segments of a circle with one of the segments on each side of a core of resistant material and the other segment on an opposite end of the core. The heater/igniter also includes two slightly converging facets extending at least partially along the tip portion of the electrodes and preferably along essentially the entire electrode. The two facets are joined together by the two annular or circular segments. These annular segments are also slightly tapered and come together to form a tip of the heater igniter. The two annular segments each include a first insulative layer and a second or outer resistant layer disposed on the insulative layer and separated from the core by the insulative layer. One of the annular segments is connected to a positive source of energy while the other annular segment is connected to a negative potential for heating the tip of the heater/igniter.

The invention also contemplates a method for making a novel ceramic heater igniter that includes the step of forming a green slightly tapered rod of ceramic material as for example a silicone nitride mixed with molybdenum disilicide ($MoSi_2$) and an insulative or non-conductive layer of silicon nitride and the step of forming a pair of slightly converging facets that converge toward the tip which preferably extend along the major part of the core to thereby form two annular segments that connect the facets and wherein the annular segments each include an insulative layer that are on opposite sides of the facets. Each of the annular segments is attached to an electrical potential wherein one of the segments is connected to a positive terminal and the other to a negative terminal.

The invention will now be described in connection with the accompanying figures wherein like reference numerals have been used to indicate like parts.

DESCRIPTION OF THE DRAWINGS

FIG. 5 is a plan view of a heater/igniter according to a second embodiment of the invention;

FIG. 6 is a plan view of the igniter shown in FIG. 5, but rotated by 90 degrees;

FIG. 7 is an end view of the igniter shown in FIG. 5;

DESCRIPTION OF THE PREFERRED EMBODIMENTS OF THE INVENTION

Figure 1:
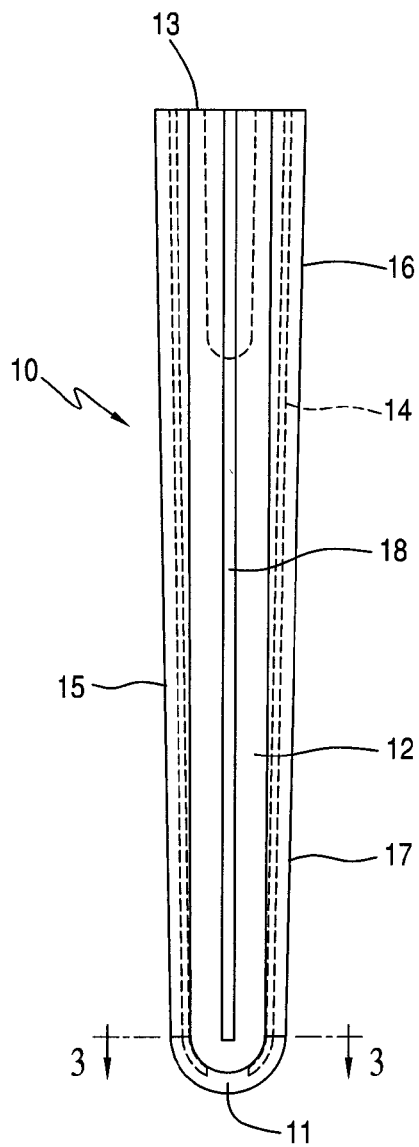
FIG. 1 is a plan view of a ceramic heater/igniter according to a first embodiment of the invention.
Figure 2:
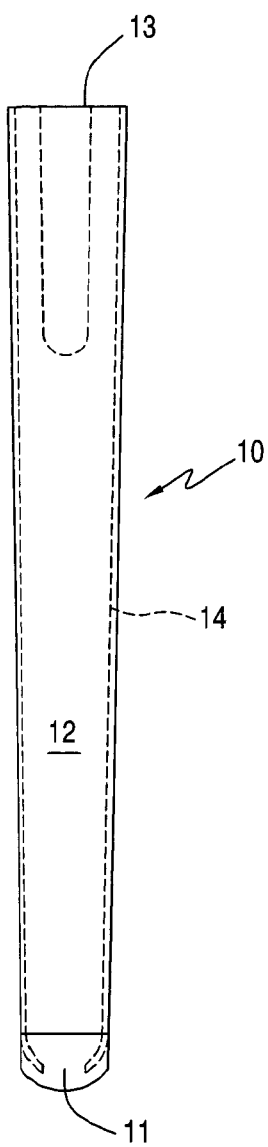
FIG. 2 is plan view of the heater/igniter shown in FIG. 1 but rotated by 90 degrees.
Figure 3:
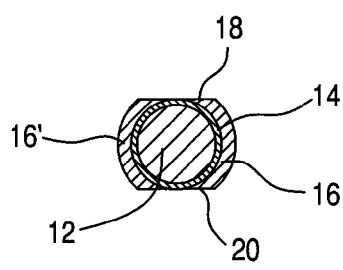
FIG. 3 is sectional view taken along the lines 3-3 in FIG. 1 of the heater/igniter shown in FIGS. 1 and 2.
Figure 4:
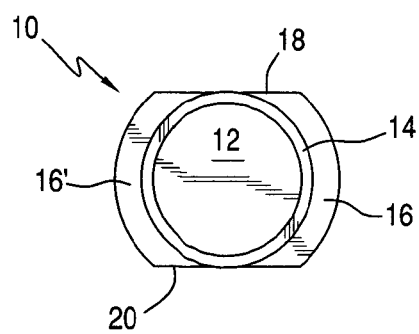
FIG. 4 is an enlarged view of FIG. 3.

Rod shaped ceramic igniters typically comprise a cylindrical shaped body that includes a tapered or narrow section that concentrates heat in specific areas. The present invention relates to modifying the surface layer and inner annular portion by removing material by slicing or grinding. For example, the resulting surface is planar. This modification is preferably done in the green stage after the ceramic is formed by slip-casting, injection molding, extrusion or the like. In this stage, the ceramic material can be easily removed or if not subsequently removed by a high speed grinder. The igniter body is subsequently heated in a sintering furnace, assembled in a holder with electrical leads attached in a conventional manner.

It has now been found that certain geometric modifications to an annular layered ceramic igniter/heater produce unique electrical properties as well as faster response time and may eliminate the need for a conductive core. In the present invention, a facet is cut along the length of the rod and separates an outer ceramic layer into conductive adjacent halves that are joined to create a U-shape at the heater tip. To be more specific, the facet is formed by partially cutting into or through the insulating layer to provide separation of the surface layer to thereby form a pair of "legs". The face of the rod provides termination for attaching positive and negative electrical leads. It is also contemplated that a complex heater pattern could be made by additional faceting in the tip region to create a coil pattern to increase the length of the circuit.

Referring now to the figures, a ceramic heater/igniter 10 can be manufactured using a number of conventional steps and one non-conventional modification. For example, four ceramic compositions are prepared using conventional techniques. The various compositions are preferably selected from about 80% by volume silicone nitride and about 20% by volume molybdenum disilicide and wherein the silicone nitride particles are larger than the particle size of the molybdenum disilicide. In a preferred embodiment of the invention there are three resistant layers, one in the core and a second and third composition in the two annular segments or legs. In this embodiment all three components are about 80% by volume silicone nitride and 20% by volume molybdenum disilicide. The components of the core and in the annular segments may each contain essentially identical amounts of silicone nitride and molybdenum disilicide, but the resitivity of the core should be less than the resitivity in the annular segments and in the tip For example, particle size in the core is larger than in the annular segments to reduce the resitivity in the core while using small particles in the annular segments to increase the resitivity of those segments.

The multi-layer ceramic heater/igniter 10 also includes an insulative layer 14 between the core 12 that can be a third phase and the layer 16, 15. The insulative layer 14 may also be made of silicone nitride and molybdenum disilicide, but should contain at least 75 volume percent of non-conductive material such as silicone nitride and up to 25% by volume molybdenum disilicide.

The multi-layer ceramic heater/igniter 10 is made by slip casting to form a green body then removing material from opposite sides of the green body to form two almost parallel, but slightly converging, facets that preferably extend over at least a majority of the heater/igniter between the back surface 13 to near the tip 11. In one embodiment of the invention the two facets 18 and 20 extend over essentially the entire length of the heater/igniter 10 as can be done for a two or three phase option.

After removing the material between the annular segments 15 and 16 (FIG. 1) the heater/igniter 10 is then slowly air dried and then heated in a vacuum at atmospheric pressure to approximately 900° C. in order to burn off the organic binder. The ceramic is then held in an inert atmosphere and heated to a temperature above 1600° C. and isotatic pressure of greater than 10 megapascales for sintering the layer into a unitary monolithic structure.

The finished product is essentially pore free to prevent accelerated erosion at high temperature and to be of sufficient strength to withstand thermal cycling and vibration. The annular segments are then attached to a positive and negative source of energy in a conventional manner.

As illustrated in FIGS. 5-7 the heater/igniter 30 for a single phase only is formed by slip casting from about 80% volume silicone nitride and 20% volume molybdenum disilicide or other suitable material as will be well understood by persons of ordinary skill in the art of making multi-layer ceramic igniters. The ceramic heater/igniter 30 includes a longitudinally extending core 32 and a slightly tapered annular segment 34 is separated from the core 32 by an insulative or non-conductive layer 36 and longitudinally extending facets 38 and 40. In FIG. 6 the dotted line at the forward end of the igniter shows the end of the inside insulator 35B.

In addition, an optional cavity 39 is formed in a rear portion of the heater igniter for termination of a second phase electrical element for use of the heater/igniter.

Figure 10:
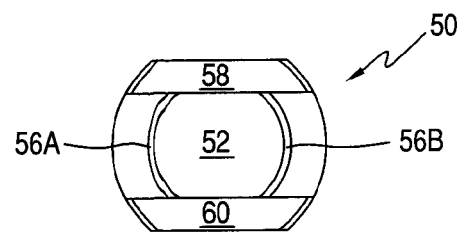
FIG. 10 is an end view of the igniter shown in FIGS. 8 and 9.
Figure 9:
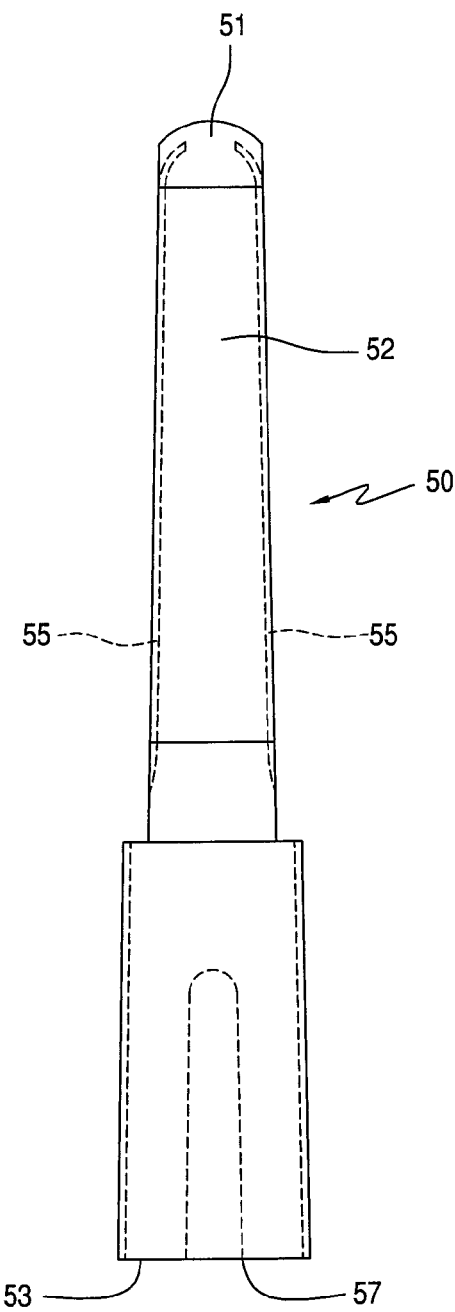
FIG. 9 is a plan view of the igniter shown in FIG. 8, but rotated by 90 degrees.
Figure 8:
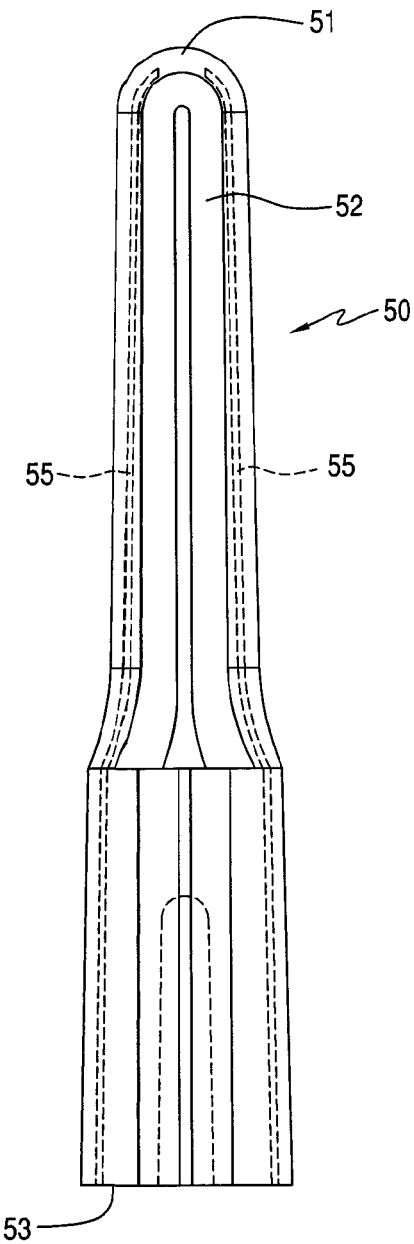
FIG. 8 is a plan view of a heater/igniter according to a third embodiment of the invention.

A heater/igniter 50 for a three phase option as shown in FIGS. 8-10 is wider than the igniter shown in FIGS. 1-4 and 5-7 and primarily designed for use with a 230V 3-phase electrical circuit. The heater/igniter 50 includes a silicone nitride/molybdenum disilicide core 52 that can be an optional third phase having a tip 51 and a base end 53 and electrically insulative or non-conductive layer 55 and a tapered electrically resistive layer 56 A, B made of an material selected from the group consisting of $Al_2O_3$, $Si_3N_4$, SiC, $Al_3N_4$, $SiO_2$, $Y_2O_3$, MgO), $Zr_2O_3$, SiAlON, $MoSi_2$, Mo, $Si_3C$, $WSi_2$, TiN, $TaSi_2$, $TiB_2$, NbSi2, $CrSi_2$, WC, $B_4C$, TaN and mixtures thereof.

An electrically conductive layer 56 is disposed on the non-conductive layer 55 and about the tip 51. Two slightly converging facets 58 and 60 are separate from one another by annular or circular segment 55. In addition, an optional (cavity is formed 57) at the base end for a third phase.

Figure 11:
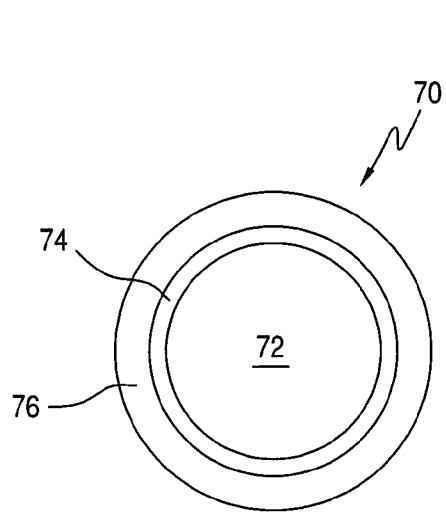
FIG. 11 shows a pre-form of a rod shaped element for use in manufacturing an igniter in accordance with the present invention.
Figure 12:
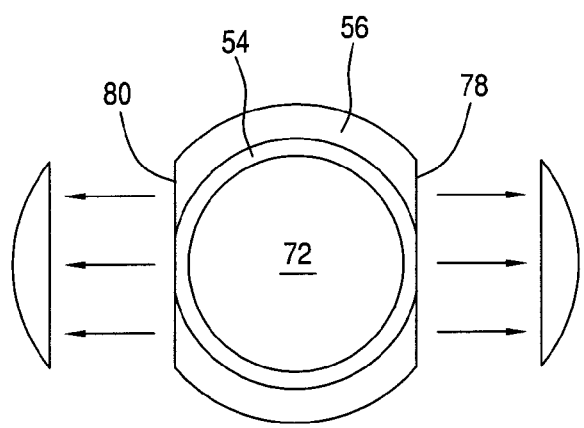
FIG. 12 is a partially exploded view showing the formation of the facets of an igniter in accordance with the present invention.

FIG. 11 illustrates a multi-layer ceramic rod 70 with a resistive core 72, non-conductive layer 74 and outer resistive layer 76. Then in FIG. 12 a pair of facets are formed by removing the outer layer 76 from opposite sides of the rod 70 to form the longitudinally extending facets 78 and 80.

Figure 13:
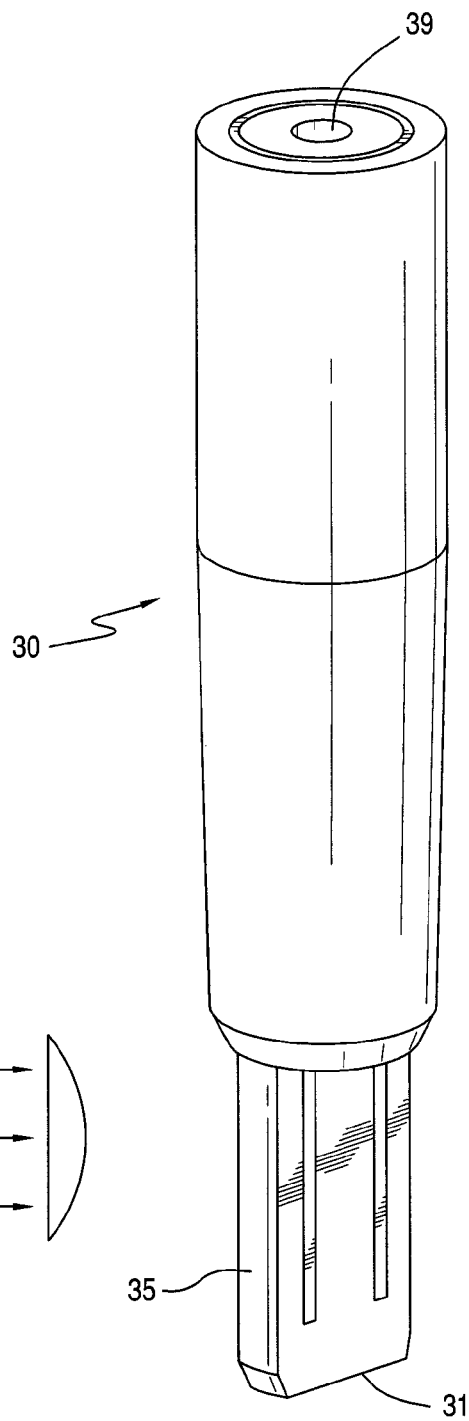
FIG. 13 is a perspective view of an igniter in accordance with the second embodiment of the present invention.

FIG. 13 is a perspective view illustrating the longitudinally extending slightly tapered flat surface of the facets 78 and 80 that extend over the length of the igniter 70.

While the invention has been described in connection with its preferred embodiments it should be recognized that changes and modifications may be made therein without departing from the scope of the appended claims.

What is claimed is:

1. A multi-layer rod shaped ceramic igniter consisting of an elongated tapered electrode having a central core of resistant material and two circular segments with one of said segments on each side of said core and the second of said segments on an opposite side of said core from the first side and two slightly converging facets each having a flat surface extending along said elongated tapered core over the length of said electrode and joined together by said circular segments and coming together to form a tip of said igniter and wherein said two circular segments include a first insulative layer and a second resistive layer disposed on said insulative layer and separated from said core by said insulative layer and wherein said core and said circular segments are made of silicon nitride and molybdenum disilicide and one of said circular segments is connected to a positive potential and the other of said circular segments is connected to a negative potential and in which said core and said resistive circular segments contain essentially identical amounts of silicon nitride and molybdenum disilicide but the particle size in said core is larger than in said circular segments to reduce the resistivity in said core while smaller particles in said circular segments increase the resistivity of said circular segments so that the resistivity of said core is less than the resistivity of said circular segments and wherein said igniter consists of an essentially pore free structure.

2. A rod shaped ceramic heater/igniter comprising an elongated tapered electrode having a central core of resistant material and defining two annular segments with one of said segments on one side of said core and the other segment on the opposite side of said core from said first of said segments, and two slightly converging facets each having a flat surface extending along said elongated tapered electrode over the length of said electrode and joined together by said two annular segments, and said two annular segments coming together to form a tip of said heater/igniter and wherein each of said two annular segments including a first insulative layer and a second resistive layer disposed on said insulative layer and separated from said core by said insulative layer in which said electrode and said resistive layer each has a positive temperature coefficient of electrical resistance and one of said annular segments is connected to a positive source of electricity and the other of said annular segments is connected to a negative source for heating said tip of said heater/igniter and in which said electrode and said resistive layer are made from silicon nitride and molybdenum disilicide and in which said core and said resistive segments contain essentially identical amounts of silicon nitride and molybdenum disilicide but the particle size in said core is larger than in said annular segments to reduce the resistivity in said core while smaller particles in said annular segments increase the resistivity of said annular segments so that the resistivity of said core is less than the resistivity of said annular segments and wherein said igniter comprises an essentially pore free structure.

* * * * *